United States Patent [19]
Bongers

[11] 3,868,204
[45] Feb. 25, 1975

[54] APPARATUS FOR CURING ELONGATE WORKPIECES

[75] Inventor: Hendrikus-Johannes Bongers, Huls Bei Krefeld, Germany

[73] Assignee: G. Siempelkamp & Co., Krefeld, Germany

[22] Filed: Feb. 14, 1974

[21] Appl. No.: 442,347

[30] Foreign Application Priority Data
Feb. 14, 1973 Germany............................. 2307103

[52] U.S. Cl................ 425/338, 100/93 P, 100/196, 425/324, 425/339, 425/383, 425/445, 425/450 C
[51] Int. Cl........................................... B29c 17/02
[58] Field of Search.......... 100/93 P, 196, 199, 195; 425/338, 383, 66, 445, 324, 339, 406, 450 C

[56] References Cited
UNITED STATES PATENTS

| | | |
|---|---|---|
| 2,602,188 | 7/1952 | Gorecki........................... 425/339 X |
| 2,867,845 | 1/1959 | Sauer............................... 425/339 X |
| 2,884,032 | 4/1959 | Thurnher........................ 100/199 X |
| 3,050,777 | 8/1962 | Siempelkamp.................. 100/195 X |
| 3,600,746 | 8/1971 | Kostur et al..................... 425/383 X |
| 3,613,155 | 10/1971 | Bloxsom............................ 425/66 X |

Primary Examiner—Robert L. Spicer, Jr.
Attorney, Agent, or Firm—Karl F. Ross; Herbert Dubno

[57] ABSTRACT

A web of unvulcanized rubber or other curable material is passed back and forth through two or more superposed stages of a multiplaten press while being led around a deflection roller between successive stages. The stack of press platens is flanked by a pair of clamps, each with as many jaws as there are platens, which simultaneously grip the several passes of the web in the open state of the press and are then moved apart to stretch the intervening web sections just before the press closes on them.

8 Claims, 5 Drawing Figures

APPARATUS FOR CURING ELONGATE WORKPIECES

FIELD OF THE INVENTION

My present invention relates to an apparatus for curing elongate workpieces of polymeric material, such as conveyor belts, in a multiplaten press of the general type described in my prior U.S. Pat. No. 3,619,332; the term "curing" includes vulcanization in the case of rubber and final polymerization in the case of synthetic resin.

BACKGROUND OF THE INVENTION

In a system as described in my prior patent, a web to be cured is led in two passes through a lower and an upper stage of a press with three platens on a level with respective jaws of a clamp positioned next to the press on the side opposite a deflecting roller around which the web passes on its way from the first to the second press stage; with the clamp closed in the open position of the press, the deflecting roller can be moved away from the press to tension the web prior to the curing step. The stretching of the web by this procedure is designed to impart tension to embedded wire strands or the like and to improve the continuity of the workpiece between sequentially cured web sections.

The part of the belt which passes around the deflecting roller is divided by that roller into two halves in which, owing to frictional resistance, the stress due to the tensioning stroke is not equally distributed. Thus, the two web sections simultaneously treated in the two press stages are not cured under identical conditions so that irregularities may result in the workpiece. This problem is especially aggravated if the distance of the deflecting roller from the press is equal to the length of a curing section, with the web advancing by the length of two sections between press closures, so that the loop formed around the roller consists of a cured and an uncured section. Another drawback of my prior system is the fact that it cannot readily be adapted to presses in which an odd number of sections are to be cured simultaneously.

OBJECTS OF THE INVENTION

The general object of my present invention is, therefore, to provide an improved curing apparatus of the character referred to which insures uniform treatment of two or more web sections simultaneously compressed in a tensioned state between stacked platens.

A more particular object is to provide means in such an apparatus for co-ordinating the operation of the press and an associated clamping mechanism in a simple and expeditious manner.

SUMMARY OF THE INVENTION

In accordance with my present invention, the press with its stack of heated platens (including a top platen, a bottom platen and one or more intermediate platens) is flanked by a pair of clamps movably disposed at opposite sides thereof. Each clamp has as many jaws as there are platens in the stack; the clamp jaws are substantially aligned with respective platens so as to bracket the several presses of the web which are led through the corresponding press stages and around one or more stationary deflecting rollers positioned beyond one or both clamps. A preferably hydraulic actuating mechanism closes first the jaws of the clamps on the interposed web passes, then moves the clamps apart to stretch these passes, and thereafter closes the platens to apply heat and pressure to the interposed stretched web sections. Upon the subsequent reopening of the clamps and the press, the web is advanced to position previously uncured sections between the platens.

According to an advantageous feature of my invention, the clamps are guided for lateral movement by extensions of the top and bottom platens which may also serve to apply the pressure of one or more pneumatic or hydraulic jacks to both the clamp jaws and the platens. In order to insure prior closure of the clamp jaws without impeding the subsequent closure of the platens, the clamp jaws should be resiliently biased in that case against the actuating jack or jacks.

According to still another feature of my invention, the intermediate platen or platens and the corresponding clamp jaw or jaws are centered with reference to the top and bottom platens and jaws, in the open position thereof, by respective linkages including a pair of articulated levers adjoining each other at an angle which decreases as the press and the clamp move from their open to their closed state; each intermediate platen and jaw is connected to one of the levers of the pair through an additional link. Especially in the case of the platens this additional link may be resiliently cushioned to equalize the curing pressure among the several press stages.

BRIEF DESCRIPTION OF THE DRAWING

The above and other features of my invention will now be described in detail with reference to the accompanying drawing in which.

SPECIFIC DESCRIPTION

Figure 1:
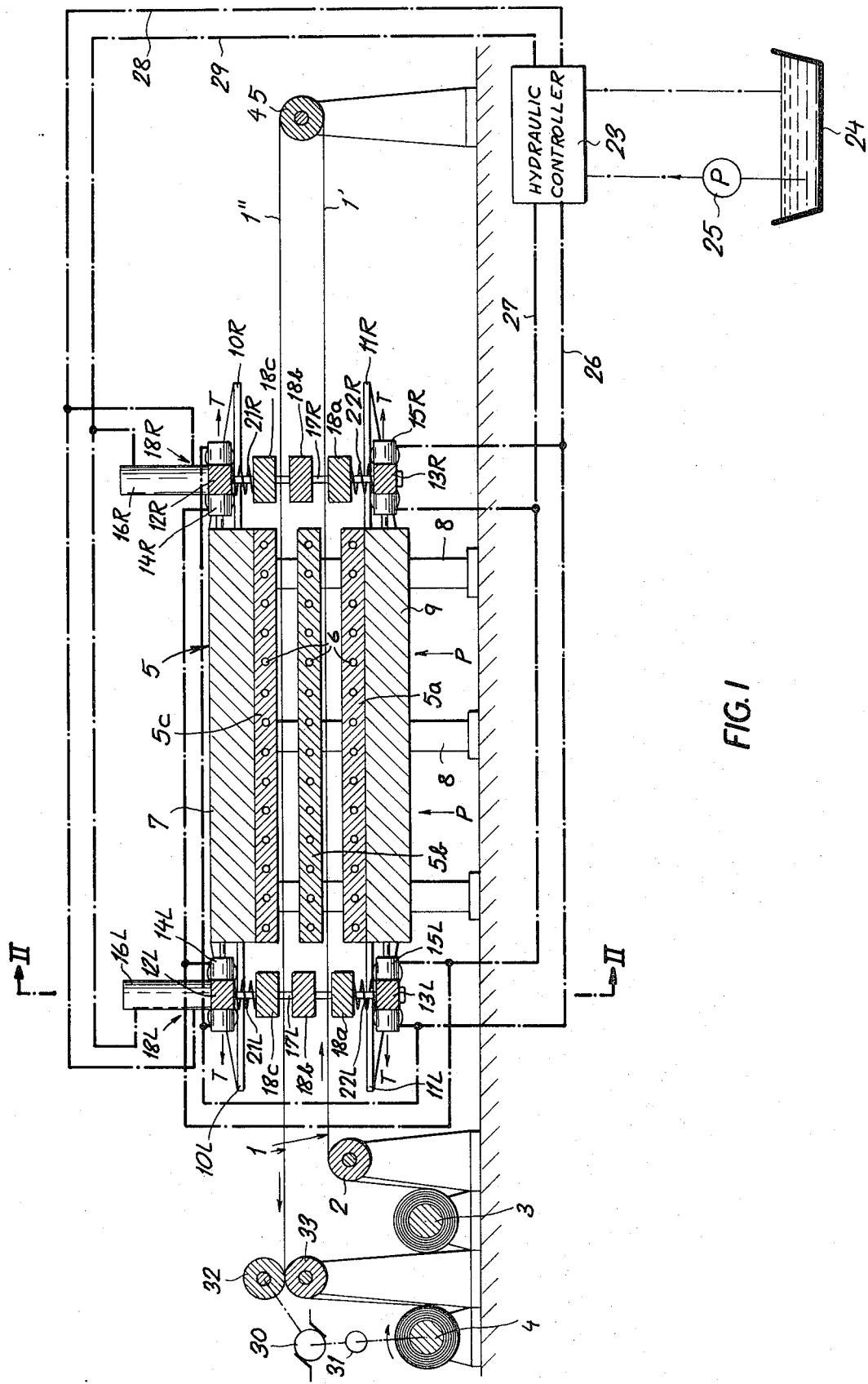
FIG. 1 is a somewhat schematic sectional elevational view of an apparatus embodying my invention.
Figure 2:
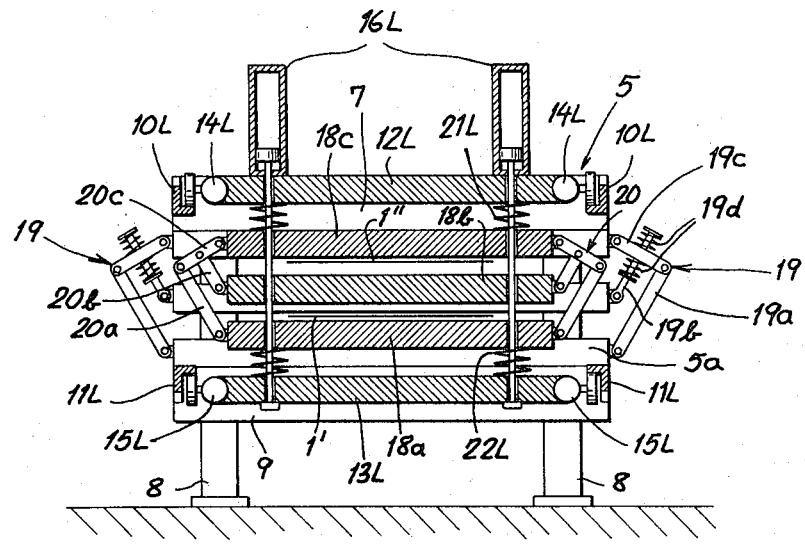
FIG. 2 is a cross-sectional view taken on the line II—II of FIG. 1.

In FIGS. 1 and 2 I have shown a multiplaten press 5 serving for the vulcanization of a web 1, such as a conveyor belt, of rubber or other elastomeric material internally reinforced with longitudinally extending wires as is well known per se. The web 1 is intermittently wound upon a reel 4 driven by a motor 30 through a slipping clutch 31, the motor being also coupled to a feed roller 32 coacting with a counterroller 33 in order to advance the web by a predetermined distance during every period of energization of that motor. Web 1 is unwound from a reel 3 from which it is led around an idler roller 2 so as to enter in a lower horizontal pass 1' between a bottom platen 5a and an intermediate platen 5b forming one curing stage of the press. The web then continues around a fixedly positioned deflecting roller 45 to form an upper horizontal pass 1'' which enters between intermediate platen 5b and a top platen 5c, forming another curing stage, before reaching the reel 4 via feed rollers 32 and 33. Platens 5a, 5b and 5c are provided with respective heating means here represented by channels 6 carrying a suitable heating fluid.

Top platen 5c is rigid with lintel 7 forming part of a press frame which also includes a set of columns 8. A bed 9, carrying the bottom platen 5a, is vertically movable along the columns 8, as is the intermediate platen 5b. Lintel 7 is provided with two pairs of rigid lateral extensions 10L, 10R on the left and the right side thereof as viewed in FIG. 1; similar pairs of extensions 11L and 11R are rigid with the movable bed 9. As best seen in FIG. 2 for elements 10L and 11L, these extensions form guide tracks for respective carriages 12L, 13L on the left and 12R, 13R on the right. Each carriage is integral with two horizontal cylinders 14L, 15L or 14R, 15R which are part of respective hydraulic jacks whose pistons are fixedly secured to the lintel 7 (in the case of upper cylinders 12L, 12R) and to the bed 9 (in the case of lower cylinders 15L, 15R). Two similar pairs of jacks include vertical cylinders 16L, 16R rising from carriages 12L and 12R, the corresponding piston 17L, 17R passing through respective sets of clamp jaws 18a (bottom), 18b (middle) and 18c (top). These jaws and their associated jacks form part of a pair of clamps 18L, 18R flanking the press 5. In the illustrated open position of the clamps and the press, the middle jaws 18b are substantially on the level of the central platen 5b whereas the bottom and top jaws 18a and 18c are approximately aligned with platens 5a and 5c, respectively. Thus, the lower pass 1' of web 1 is bracketed by the bottom and middle jaws of each clamp whereas the upper path 1" is bracketed by the middle and top jaws.

As seen in FIG. 2, the three platens 5a, 5b, 5c are interconnected by a pair of linkages 19 (in front and in back) each including a pair of articulated levers 19a and 19c pivoted to platens 5a and 5c, respectively; a rod 19b is pivoted to platen 5b and is also fastened, through the intermediary of buffer springs 19d, to the midpoint of lever 19c so as to hold the middle platen 5b centered between the top and bottom platens 5a and 5c when the press is open. Springs 19d serve to cushion the closure stroke and to distribute the curing pressure evenly between the upper and lower web sections despite possible variations in web thickness; they are, however, strong enough to separate the platens from one another even if they initially adhere to the vulcanized workpiece. The linkages 19 may, of course, be duplicated at intervals at the front and at the rear of the press.

Similar linkages 20 are provided for each of the clamps 18L and 18R. Each linkage 20 comprises two articulated levers 20a, 20c, respectively pivoted to the bottom and top clamp jaws 18a, 18c, as well as a further lever 20b pivoted to the middle jaw 18b and to the midpoint of lever 20c. Moreover, the top and bottom jaws are separated from carriages 12L, 12R and 13L, 13R by coil springs 21L, 21R and 22L, 22R which surround the rods of the respective pistons 17L, 17R and are designed to limit the separation of these top and bottom jaws. Since the gap between the open clamp jaws is less than that between the platens in the open press position, actuation of jacks 16L and 16R to lift the lower carriages 13L and 13R along with bed 9 causes the clamps 18L and 18R to close on the web passes 1' and 1" before these passes come under pressure from platens 5a, 5b, 5c. Further pressurization of the jacks allows the press to close fully with compression of the springs 21L, 22L and 21R, 22R.

In accordance with an important feature of my invention, the cylinders 15L and 15R are pressurized as soon as the clamps close, and before the press-closing stroke is completed, to drive the clamps 18L and 18R apart as their carriages 12L, 13L and 12R, 13R roll outwardly along tracks 10L, 11L and 10R, 11R. This mode of operation is programmed by a hydraulic controller 23 supplied from an oil sump 24 by a pump 25; conduits 26 (for tensioning outward motion, arrows T) and 27 (for slackening inward motion) extend from controller 23 to cylinders 14L, 15L and 14R, 15R; conduits 28 (for compressing upward motion, arrows P) and 29 (for releasing downward motion) lead from the controller to cylinders 16L and 16R.

Figure 5:
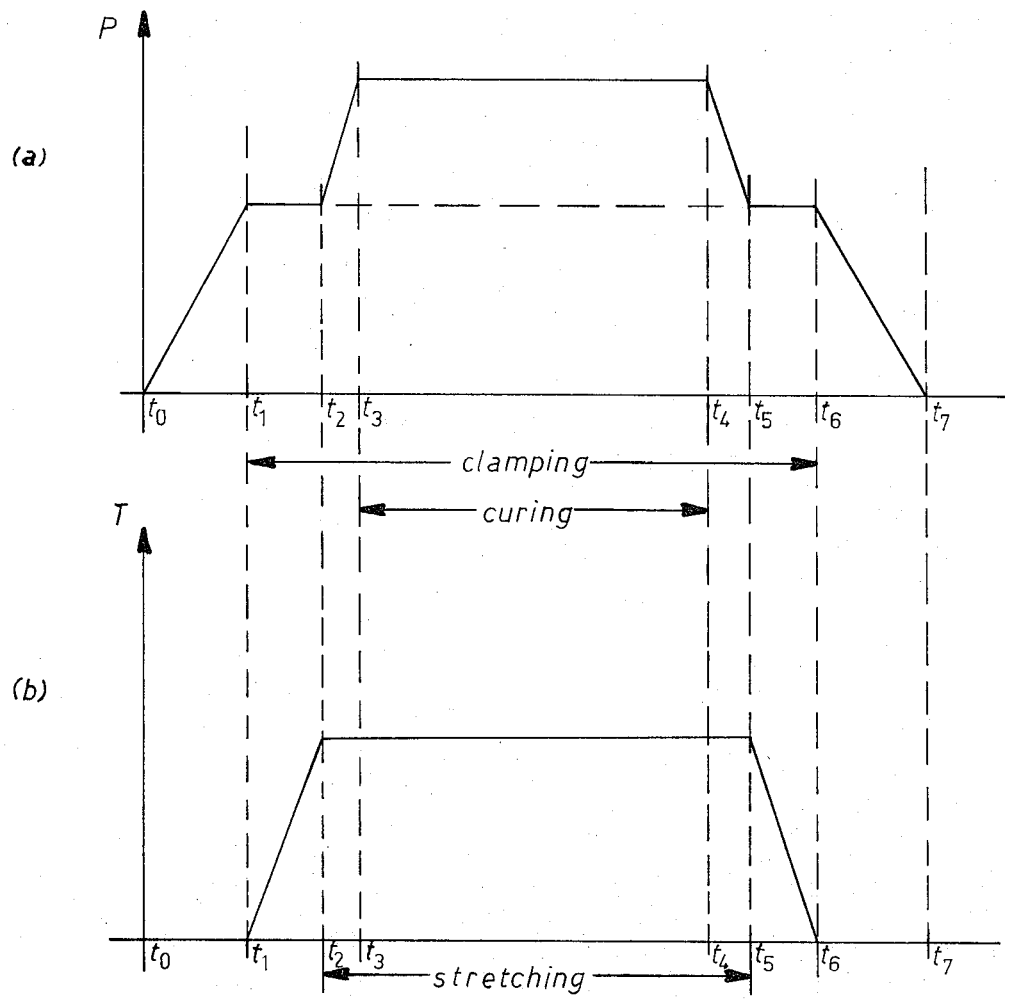
FIG. 5 is a set of graphs serving to explain the mode of operation of the apparatus.

This mode of operation has been illustrated in FIG. 5 which shows the relative timing of the application of clamping and curing pressure P, graph (a), and of tensile stress T, graph (b), to the operatively positioned sections of workpiece 1. At the start of a press cycle, i.e., at time $t_0$, oil begins to flow into conduit 28. At time $t_1$ the pressure P in cylinders 16L and 16R has built up to a level at which the clamps 18L and 18R firmly grip the web passes 1' and 1" at opposite sides of the still partly open press 5. Next, in the interval $t_1 - t_2$, conduit 26 is pressurized so that clamps 18L and 18R move outwardly to create the desired level of tension T in the web. Thereafter, the pressure in cylinder 16L and 16R is increased until, at time $t_3$, the press is fully closed around the tensioned web and the curing takes place. Upon completion of the curing process at time $t_4$, the previous steps are reversed with partial reopening of the press in the interval $t_4 - t_5$, return of the clamps to their starting position in the interval $t_5 - t_6$, and unclamping as well as complete opening of the press in the interval $t_6 - t_7$.

In the system illustrated in FIG. 1, the spacing of deflecting roller 45 from press 5 substantially equals the width of the press platens in the direction of web motion and therefore the length of each of the two web sections cured in a single press cycle. Take-up reel 4 and feed roller 32, which remain stationary during the clamping and curing operation, are then driven by motor 30 to advance the web 1 by the length of two sections, equaling the length of the loop formed to the right of the press (FIG. 1) around roller 15, whereby a hitherto uncured section from the lower half of that loop enters between platens 5b and 5c whereas another uncured section unwound from reel 3 is received between platens 5a and 5b. The section just cured in the stage formed by these latter platens comes to lie in the upper half of the loop while another as yet uncured section moves through that stage into the lower loop half for subsequent treatment in the stage defined by platens 5b and 5c. Thus, the entire web 1 is eventually vulcanized by the successive curing of contiguous sections thereof in the two press stages.

Figure 4:
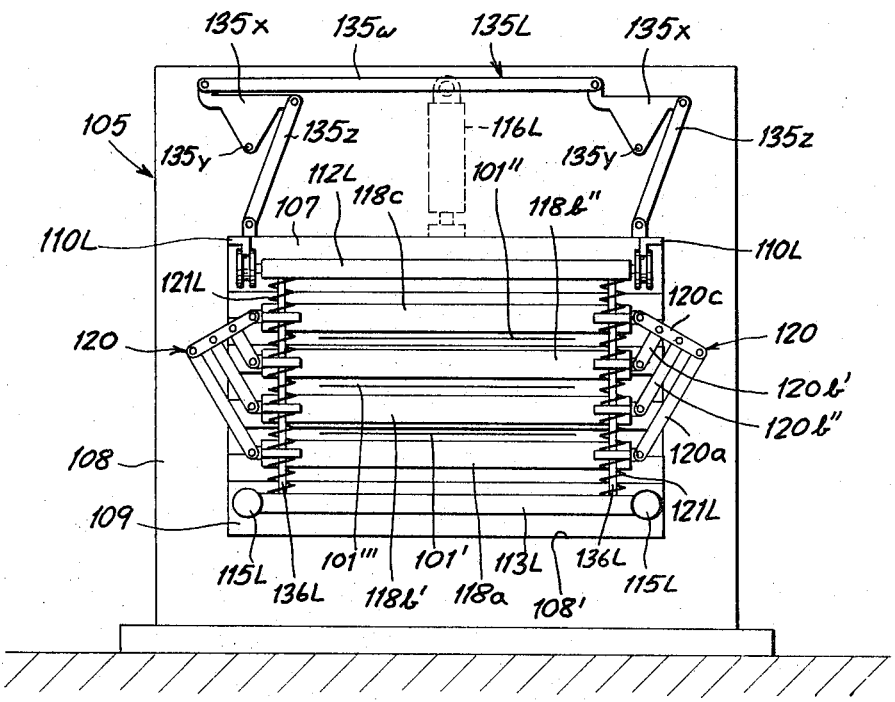
FIG. 4 is a side view taken on the line IV—IV of FIG. 3.
Figure 3:
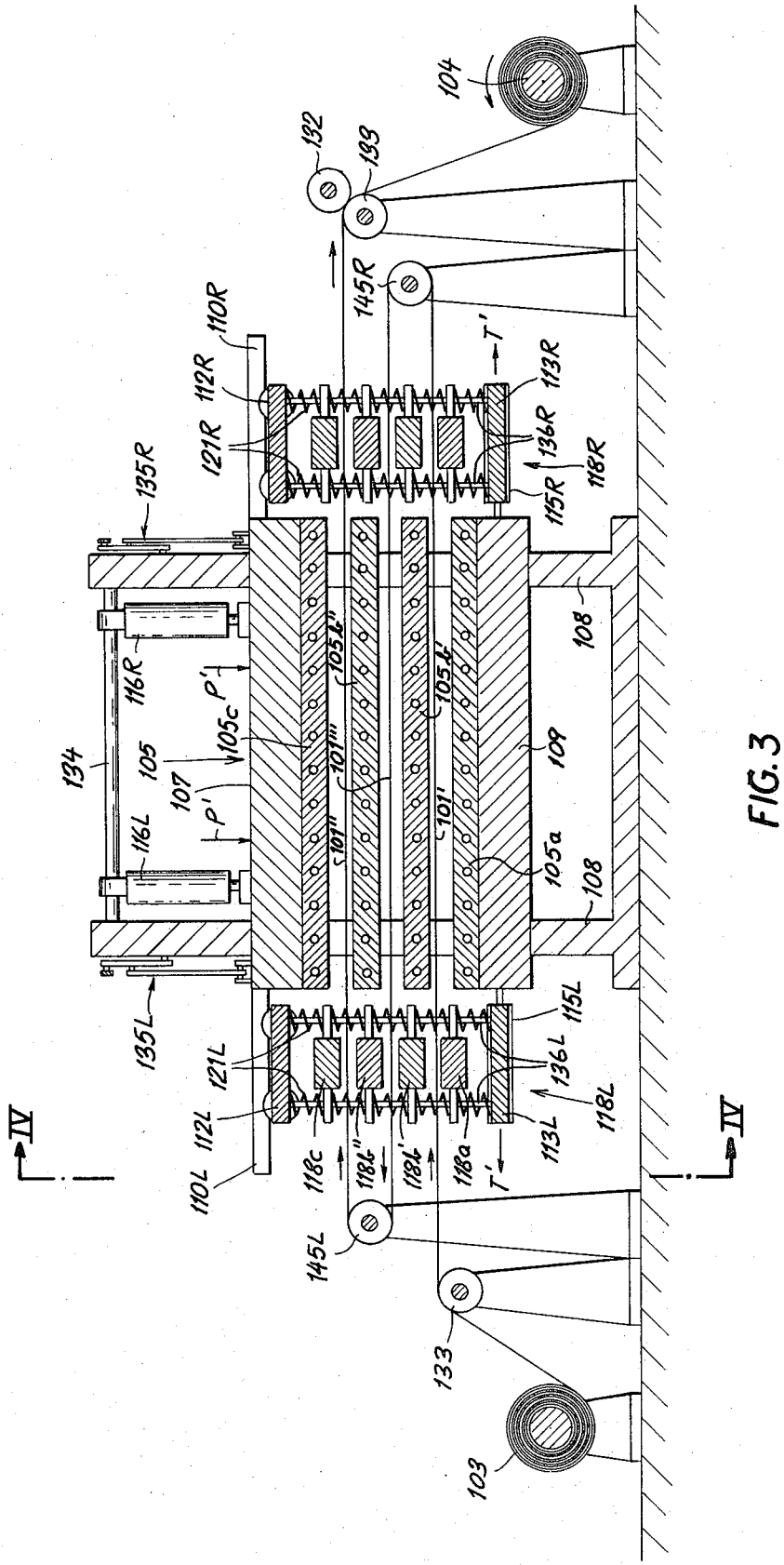
FIG. 3 is a view similar to FIG. 1, showing a modification.

The system of FIGS. 3 and 4, which operates in the same general manner as the one just described, differs from that of FIGS. 1 and 2 mainly by the addition of a third press stage and by the inversion of the operating stroke of the clamping and curing jacks. Elements similar to those of the preceding embodiment have been designated in FIGS. 3 and 4 by the same reference numerals with the addition of a "1" in the position of the hundreds digit; these elements will therefore be redescribed only to the extent necessary for explaining the operation of the modified system. The drive motor for the take-up reel 104 and for the feed roller 132 has not been illustrated.

The press 105 of FIGS. 3 and 4 has a frame which consists essentially of a pair of stanchions 108 and a stationary bed 109 received in rectangular cutouts 108' thereof which also serve for the vertical guidance of a top slab 107 and two intermediate platens 105b' and 105b''; the bottom platen 105a and the top platen 105c are carried on bed 109 and slab 107, respectively. The platens are normally separated by articulated linkages (not shown) which are similar to the linkages 120 (FIG. 4), described below, and differ from the linkages 19 of FIG. 2 only by the presence of a second spring-loaded rod corresponding to rod 19b, the two rods engaging the intermediate platens 105b' and 105b'' and being anchored to the upper lever (19c in FIG. 2) at points spaced from the ends of that lever by one third and two thirds of its length.

The slab 107 with its platen 105c is suspended from the top of the press frame by a pair of hydraulic jacks 116L, 116R which are anchored to the stanchions 108 by a rod 134. Slab 107 is maintained level by two parallelogrammatic linkages 135L, 135R which, as illustrated in FIG. 4 for the linkage 135L, comprise a pair of triangular levers 135x fulcrumed at 135y to the adjoining stanchion 108, arms 135z hinged to the slab 107 and to a free end of each lever 135x, and a horizontal bar 135w articulated to the other free ends of the levers.

Slab 107 has two pairs of lateral extensions 110L and 110R which form tracks for respective carriages 112L, 112R engaging these tracks from below. The carriages support depending rods 136L, 136R slidably supporting two sets of clamp jaws 118a, 118b', 118b'', 118c of a pair of hydraulic clamps 118L, 118R each further including a base plate 113L, 113R integral with a pair of horizontal cylinders 115L, 115R. The carriages 112L, 112R, the plates 113L, 113R and the intervening clamp jaws are normally spaced apart by spring stacks 121L, 121R and by articulated linkages 120 with lever 120a, 120c and rods 120b', 120b'' respectively pivoted to the platens 105a, 105c, 105b' and 105b'' to maintain proper clearances therebetween for traversal by three passes 101' (bottom), 101'' (top) and 101''' (center) of web 101. Two fixedly positioned deflecting rollers 145L on the left and 145R on the right are engaged by the web loops interconnecting the several passes, i.e., the middle and upper passes 101''', 101'' in the case of roller 145L and the lower and middle passes 101', 101''' in the case of roller 145R. The spacing of these deflecting rollers from the press is half that of roller 15 in FIG. 1 so that the loop length equals the length of a section cured in one press stroke. In this embodiment, the web is advanced by three section lengths at a time whereby a section cured in the bottom stage loops itself about roller 115L whereas a previously uncured section loops itself about roller 115R; the sections cured in the middle and upper press stages are moved completely out of the apparatus as the uncured section from the region of roller 115R reaches the top stage.

The nonillustrated hydraulic controller for cylinders 115L, 115R and 116L, 116R establishes an operating cycle generally similar to that described above with reference to FIG. 5. In the open state of the press and the clamps, cylinders 116L and 116R are pressurized to lift the slab 107 to the top of the cutouts 108' while the spring stacks 136L and 136R expand the assemblies of clamp jaws as shown in FIGS. 3 and 4. The subsequent depressurization (or reverse pressurization) of cylinders 116L and 116R lowers the slab 107, as indicated by arrows P', but closes the press 105 only partially by the time the clamps 118L and 118R engage the web 101. Next, cylinders 115L and 115R are pressurized to stretch the web, as indicated by arrows T', whereupon the press closes completely. After the necessary curing interval, the reverse procedure is followed to restore the illustrated starting position.

In principle, separate hydraulic jacks or equivalent actuators could be employed for the press and for the clamps in either of the described embodiments. However, the use of the same actuators for both clamping and pressing, in staggered relationship, greatly simplifies the fluidic system and also creates a more compact assembly since the top and bottom parts of both the clamps and the press move as a unit relatively to each other. Furthermore, the clamps can be positioned in immediate proximity of the press platens so as to minimize the excess length of web that is wastefully stretched during each tensioning stroke.

Since the platens remain spaced apart during the stretching operation, the tensioning of the web sections takes place against minimum frictional resistance which, moreover, is symmetrical with reference to the central plane of the press in view of the simultaneous and opposite displacement of the clamps at like speeds.

Naturally, a four-platen press as shown in FIGS. 3 and 4 may also be used with the upwardly acting closure mechanism of FIGS. 1 and 2, or vice versa.

I claim:

1. An apparatus for curing a web of polymeric material, comprising:
   a press with a stack of heated platens, including a top platen, a bottom platen and at least one intermediate platen forming a plurality of superposed curing stages between them;
   stationary deflecting means positioned alongside said stack between the levels of successive stages for engagement by a web led in several passes through said stages;
   a pair of clamps movably disposed at opposite sides of said stack, each clamp being provided with a top jaw, a bottom jaw and at least one intermediate jaw substantially aligned with said platens for bracketing the passes of said web entering and leaving said stages;
   intermittently operable actuating means for closing first said jaws and thereafter said platens on the interposed passes of said web;
   mechanism synchronized with said actuating means for moving said clamps apart in a position of closure of said jaws but prior to closure of said platens with consequent stretching of said passes preparatorily to application of heat and pressure to sections of the stretched web for curing same; and
   feed means operative upon a reopening of said jaws and said platens to advance said web for positioning previously uncured sections between platens.

2. An apparatus as defined in claim 1, further comprising lateral extensions on said top and bottom platens engaged by said clamps for guiding same toward and away from said press under the control of said mechanism.

3. An apparatus as defined in claim 2 wherein said actuating means comprises fluid-operated jack means movable with said clamps along said extensions.

4. An apparatus as defined in claim 3 wherein said extensions are engaged by said jack means for imparting closing and opening motions concurrently to said jaws and said platens, said jaws being resiliently biased against said jack means to close before said platens.

5. An apparatus as defined in claim 1 wherein said stack and said clamps are provided with centering means maintaining said intermediate jaw and platen separated from said top and bottom jaws and platens in the open position thereof.

6. An apparatus as defined in claim 5 wherein said centering means comprises a first pair of articulated levers pivoted to said top and bottom platens, a first link extending from one of the levers of said first pair of said intermediate platen, a second pair of articulated levers pivoted to said top and bottom jaws of each clamp, and a second link extending from one of the levers of said second pair to the intermediate jaw of the respective clamp.

7. An apparatus as defined in claim 6 wherein said first link is spring-loaded for giving said intermediate platen mobility relative to said top and bottom platens.

8. An apparatus as defined in claim 1, wherein said deflecting means comprises a roller separated from stack by a distance equal to a whole number times half the width of said platens in the direction of advance of said web.

* * * * *

UNITED STATES PATENT OFFICE
CERTIFICATE OF CORRECTION

PATENT NO. : 3,868,204
DATED : 25 February 1975
INVENTOR(S) : Hendrikus-Johannes BONGERS It is certified that error appears in the above-identified patent and that said Letters Patent are hereby corrected as shown below:

Col. 1, line 63, for "presses" read -- passes --.

Col. 4, line 4, for "15" read -- 45 --;

Col. 5, line 56, for "115L" read -- 145L --; lines 57 and 60, for "115R" read -- 145R --.

Claim 1, last line (col. 6, line 62), for "platens" read -- said platens --.

Claim 8, line 3 (col. 8, line 12), for "stack" read -- said stack --.

Signed and Sealed this second Day of December 1975

[SEAL]

Attest:

RUTH C. MASON
Attesting Officer

C. MARSHALL DANN
Commissioner of Patents and Trademarks